United States Patent

Mizutani et al.

Patent Number: 5,844,565
Date of Patent: *Dec. 1, 1998

[54] GENERATING IMITATION CUSTOM ARTWORK BY SIMULATING BRUSH STROKES AND ENHANCING EDGES

[75] Inventors: Masao Mizutani, San Jose; Chuen-Chien Lee, Fremont, both of Calif.

[73] Assignees: Sony Corporation, Tokyo, Japan; Sony Electronics, Inc., Park Ridge, N.J.

[ * ] Notice: The term of this patent shall not extend beyond the expiration date of Pat. No. 5,621,868.

[21] Appl. No.: 713,989

[22] Filed: Sep. 13, 1996

Related U.S. Application Data

[63] Continuation of Ser. No. 228,286, Apr. 15, 1994, Pat. No. 5,621,868.

[51] Int. Cl.⁶ ........................................... G06T 5/00
[52] U.S. Cl. ........................ 345/429; 345/431; 345/432; 382/274
[58] Field of Search ........................ 382/276, 274, 382/277, 282, 286, 199, 263, 264, 266; 395/433, 434; 348/578; 345/429, 431, 432

[56] References Cited

U.S. PATENT DOCUMENTS

| | | | |
|---|---|---|---|
| 4,782,388 | 11/1988 | Lake | 345/578 |
| 4,907,072 | 3/1990 | Narusawa | 348/578 |
| 4,956,872 | 9/1990 | Kimura | 382/44 |
| 5,038,223 | 8/1991 | Yamada | 358/445 |
| 5,063,448 | 11/1991 | Jaffray et al. | 348/578 |
| 5,109,282 | 4/1992 | Peli | 358/298 |
| 5,245,432 | 9/1993 | Jaffray et al. | 348/578 |
| 5,325,200 | 6/1994 | Jaffray et al. | 348/586 |
| 5,363,209 | 11/1994 | Eschbach et al. | 358/445 |

FOREIGN PATENT DOCUMENTS

| | | | |
|---|---|---|---|
| 2207587 | 2/1989 | United Kingdom | G06F 15/72 |

OTHER PUBLICATIONS

Pham, Binh, *Expressive Brush Strokes,* Graphical Models and Image Processing, vol. 53, No. 1, pp. 106, Sep. 1991.

Chua, Yap Siong, *Bézier brushstrokes,* Computer–Aided Design, vol. 22, No. 9, pp. 550–555, Nov. 1990.

Haeberli, Paul, *Paint By Numbers: Abstract Image Representations,* Computer Graphics, vol. 24, No. 4, pp. 207–214, Aug. 1990.

(List continued on next page.)

*Primary Examiner*—Mark K. Zimmerman
*Attorney, Agent, or Firm*—Wood, Herron & Evans L.L.P.

[57] ABSTRACT

The precision of an initial image is reduced through image automatic processing in a manner simulating techniques used in the production of a custom art work. The resulting image, although generated without human intervention, has a pleasing, customized appearance which can be desirable to consumers seeking decorative art work. One way of reducing the precision of the initial image is modifying portions of the image to have more uniform luminance, color saturation, or color hue, producing a resulting image appearing to contain brush strokes. Alternatively, the precision of the initial image is reduced by locating contrast edges in the image, and modifying the luminance along these edges, producing a resulting image in which objects and features are outlined and have an enhanced definition from the background.

28 Claims, 7 Drawing Sheets

OTHER PUBLICATIONS

Fractal Design Corporation, "Painter" User Guide, pp. 201–202, purchased 1995.

Adobe Corporation, "Gallery Effects" Brochure, apparently Feb. 1992.

Adobe Systems Incorporated, "Gallery Effects" Brochure, Copyright 1995.

M. Hudnall, et al., Test Lab (Paint Software Review), Compute, vol. 15, No. 2, p. (13), Feb. 1993.

Z–Soft, "Photofinish" brochure, copyright 1993.

How Image Editors Use Filters to Alter Reality, Imaging Magazine, v2, n8, p. 44, Aug. 1993.

PC Connection, "Altamira Composer", Photoshop, Picture Publisher, Photomorph Digital Morph catalog pp. 31–34, date unknown.

Fractal Design Corp,, "Painter", X2, Sketcher, and Color-Studio brochure, 1993.

B.J. Dawson, Changing Perceptions of Reality:Image editing lets you interactively improve rearrange, modify and adjust images any way you want, BYTE, p. 293, vol. 14, No. 13, Dec. 1989.

Summary of Fractal Design Corporation's products release dates.

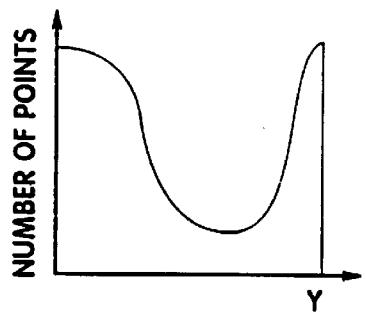
FIG. 16A
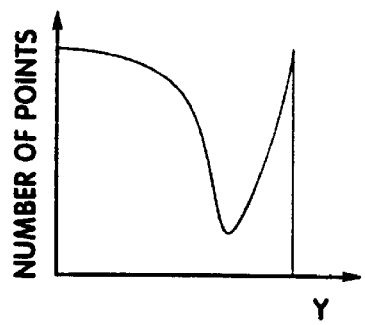
FIG. 16B
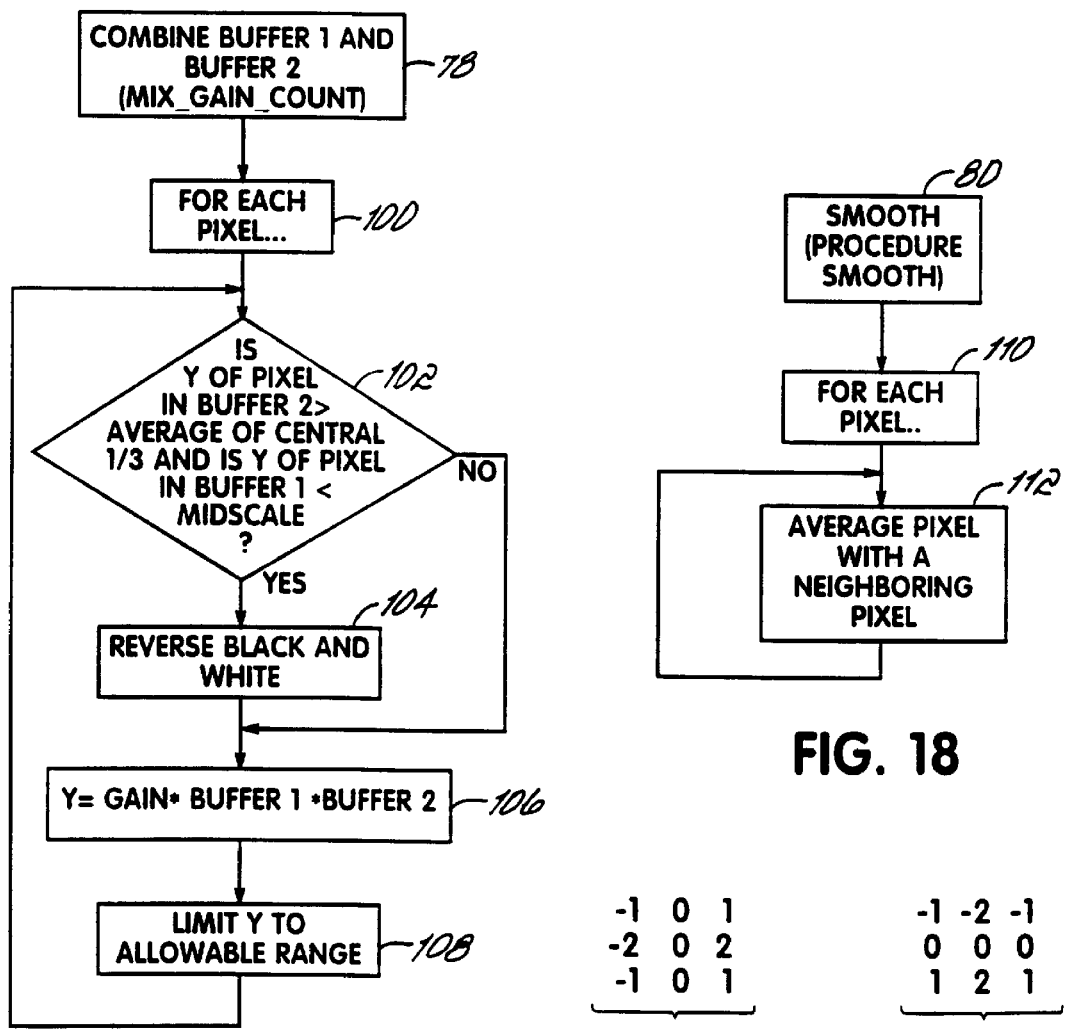
FIG. 17
FIG. 14A
FIG. 14B

GENERATING IMITATION CUSTOM ARTWORK BY SIMULATING BRUSH STROKES AND ENHANCING EDGES

RELATED APPLICATIONS

This is a continuation application of application Ser. No. 08/228,286 filed on Apr. 15, 1994, now U.S. Pat. No. 5,621,868, entitled GENERATING IMITATION CUSTOM ARTWORK BY SIMULATING BRUSH STROKES AND ENHANCING EDGES.

REFERENCE TO MICROFICHE APPENDIX

A microfiche appendix is attached to this application. This appendix is subject to copyright protection. The copyright owner has no objection to copying of the appendix in the form in which it appears in the files of the United States Patent Office, but reserves all other rights under copyright law.

FIELD OF THE INVENTION

The present invention relates to the automatic generation, for display or printing, of images which resemble custom artwork.

BACKGROUND OF THE INVENTION

It is known to apply computers to problems of image generation and enhancement. Image enhancement techniques have been applied to scientific applications, producing higher definition images providing improved insight. Computer animation has been used to produce high-definition images, resembling photographs, for movies and other entertainment media. As computers and software have become more powerful, computer generated or enhanced images have become closer to the photographic ideal.

Some software packages also provide special effects which deform images. For example, some packages can modify the color or luminance of an image to produce what appears to be a photographic negative of the image.

SUMMARY OF THE INVENTION

Some consumers seeking decorative artwork prefer custom art work such as oil and watercolor paintings or lithography to more precise art forms such as photography. Custom art work includes an expressive aspect often lacking from photography; typically the colors and important elements of custom art work are emphasized and exaggerated as compared to a photograph, which can result in a pleasing overall impact. Furthermore, the customized nature of custom art work is often immediately apparent from the coarseness of presentation, e.g., from the brush strokes and object outlines which can be seen upon close inspection; this customized appearance can also enhance a consumer's perception and attraction to a work.

The drive in automated computer image processing has been toward either (1) enhancing the precision of an images to approach a photographic ideal, or (2) modifying an image to produce a manifestly computer-generated result. The present invention seeks a different goal. In accordance with principles of the present invention, the precision of an initial image is reduced through automatic image processing in a manner simulating techniques used in the production of a custom art work, producing an image with a pleasing, customized appearance which can be desirable to consumers seeking decorative art work. Although the resulting image appears to be the product of human labor, the process does not require human intervention.

In one aspect of the present invention, the precision of the initial image is reduced by modifying portions of the image to have more uniform luminance, color saturation, or color hue, producing a resulting image appearing to contain brush strokes similar to those in oil paintings.

Specifically, for each portion simulating a brush stroke, luminance and color values are selected from one pixel in the initial image and used as the basis for all of the pixels in the portion. To enhance the overall contrast of the image, the luminance of the selected value is reduced if the value is less than a computed average, otherwise the luminance of the selected value is increased. The pixels of the portion are then generated from the computed luminance and color values. A small random variation or dithering is also added to produce a more realistic result.

The portions are elongated, and in one embodiment have parabolic curved elongated edges, and thus have a more realistic brush-stroke-like appearance. These elongated portions are arranged in one of four orientations (vertical, horizontal, or diagonal); the orientation is determined by measuring the direction of maximum contrast in a blurred version of the initial image, and orienting the portion perpendicular to this direction, simulating typical painting techniques. For further improved simulation, the size of the portion is modified in response to the level of contrast. The portions thus created are overlaid on a background formed by blurring the initial image.

To further improve the simulation, smaller portions simulating small brush strokes are created over the initial set of large portions in regions of high contrast. These smaller portions simulate detailed brush strokes usually created near object edges in an original oil painting.

In another aspect, the precision of the initial image is reduced by locating contrast edges in the image, and modifying the luminance along these edges, producing a resulting image in which objects and features are outlined and therefore have an enhanced definition from the background, such as in watercolor paintings.

Specifically, a differential measurement of contrast is generated at each pixel of the initial image; then, after processing these contrast measurements with a logarithmic function, the contrast measurements are combined with the initial image, enhancing the edges in the initial image. For maximum enhancement, edges in bright regions are brightened, whereas edges in dark regions are darkened.

The above and other aspects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIGS. 14A and 14B are illustrations of the manner in which differential luminance values are computed by the procedure of FIG. 13.

FIGS. 16A and 16B are histograms of differential values respectively before and after modification by the procedure of FIG. 15;

FIG. 17 is a flow chart of a procedure for combining differential values with an initial image; and FIG. 18 is a flow chart of a procedure for smoothing a combined image to produce a result.

DETAILED DESCRIPTION OF SPECIFIC EMBODIMENTS

Figure 1A:
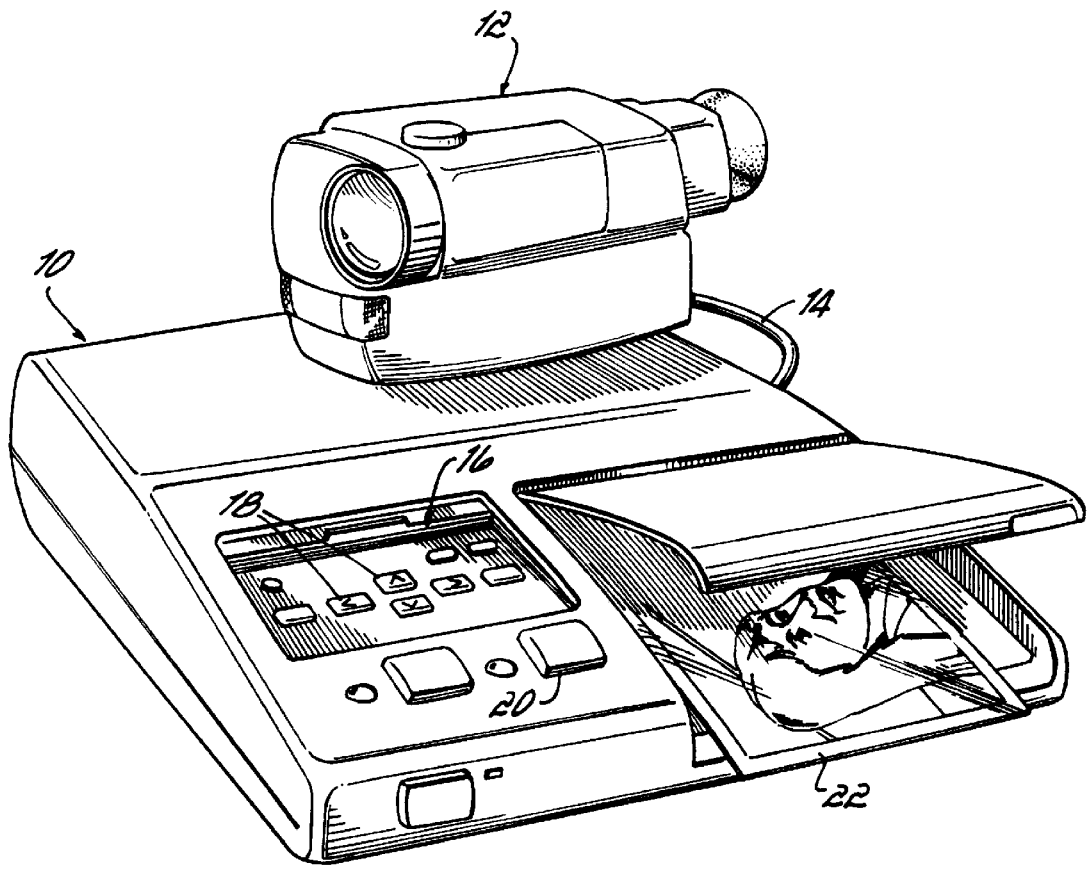
FIGS. 1A and 1B are perspective view of a video printer, video camera, and monitor which can utilize principles of the present invention.

FIG. 1A illustrates a video printer 10. The printer 10 may be coupled to a video camera 12 via shielded cables 14. Printer 10 includes a control panel 16 having buttons 18 with which an operator can control video printer 10 to select a desired image on a video tape in camera 12. When a desired image has been located, the operator presses button 20 to generate a photograph 22 having a still print of the selected image. Video printer 10 may be used, for example, by consumers to produce still photographs from videotapes of vacations, family gatherings, etc. Thus, video printer 10 allows video camera 12 to serve the dual roles of a video and still camera.

Figure 1B:
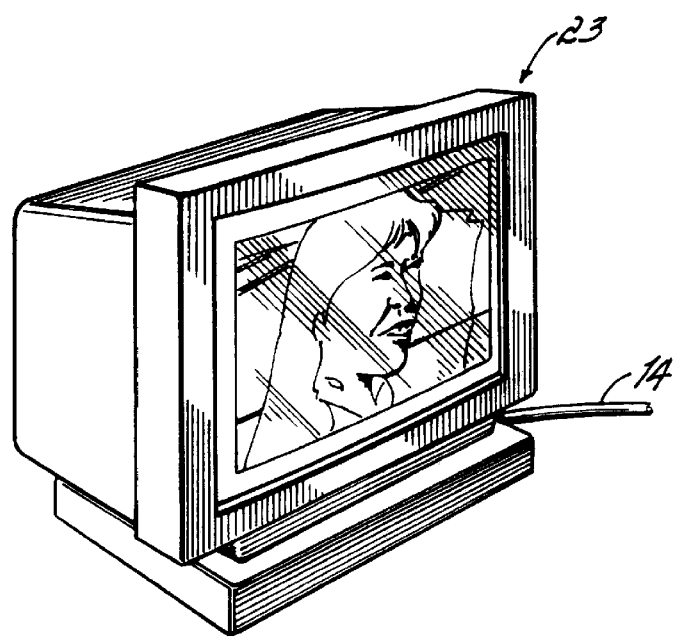

FIG. 1B illustrates a monitor 23 which can be similarly coupled to video camera 12 via cable 14, to display video from camera 12. Alternatively, any other video source, such as a television broadcast, a desktop VCR, or a laser disc player, can provide video to monitor 23.

Figure 1C:
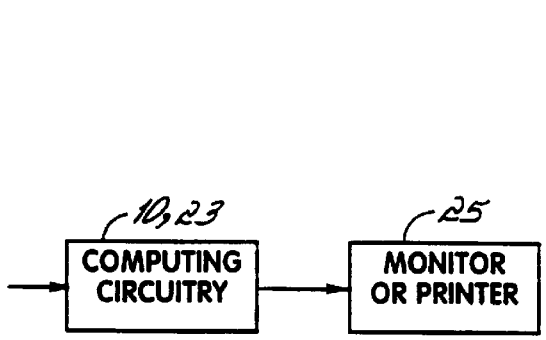
FIG. 1C is a functional block diagram of computing circuitry cooperating with the printer, camera, or monitor.

Referring to FIG. 1C, in accordance with principles of the present invention, computing circuitry 25, e.g. special purpose computing circuitry and/or one or more microprocessors running software, processes images before the images are printed by printer 10 or displayed on monitor 23.

As described in detail below, the processed image has characteristics simulating the appearance of original artwork. Thus, when printer 10 is used with computing circuitry 25, printer 10 generates still images simulating custom artwork; when monitor 23 is used with computing circuitry 25, monitor 23 generates either still images simulating custom artwork, or a series of sequentially-displayed images, which simulate custom animation.

Computing circuitry 25 may be mounted in a separate unit 25 as illustrated in FIG. 1C, or may be incorporated into the existing circuitry of printer 10, monitor 23 or camera 12.

Figure 2A:
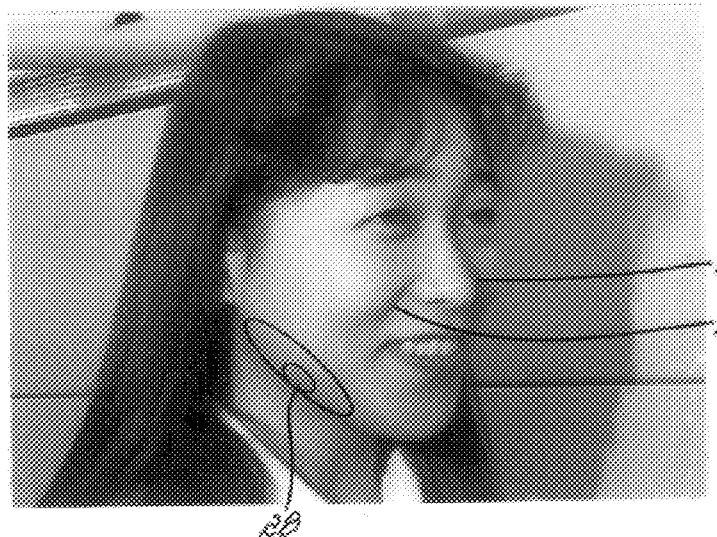
FIG. 2A is an initial image prior to processing.

Referring to FIG. 2A, there is shown an unprocessed image of the type which could be produced by printer 10 or monitor 23. Indicated on the image are two edges of contrast 24, 26 and areas 28 of varying contrasts.

Figure 2B:
FIG. 2B is an image produced by generating simulated brush strokes in the image of FIG. 2A in accordance with principles of the invention.

Referring to FIG. 2B, in accordance with principles of the present invention, the image of FIG. 2A may be modified to simulate techniques used in producing oil paintings. As described in greater detail in the following figures, to perform such a modification, portions of the initial image are modified to have more uniform luminance color saturation and/or color hue, producing visible portions of uniform luminance or hue in the resulting image that resemble a brush strokes of oil paintings. Such simulated brush strokes 29 can be seen in areas 28 in FIG. 2B. Furthermore, as described in more detail below, the overall contrast of the image is increased, as is apparent by comparison between FIGS. 2B and 2A.

Figure 2C:
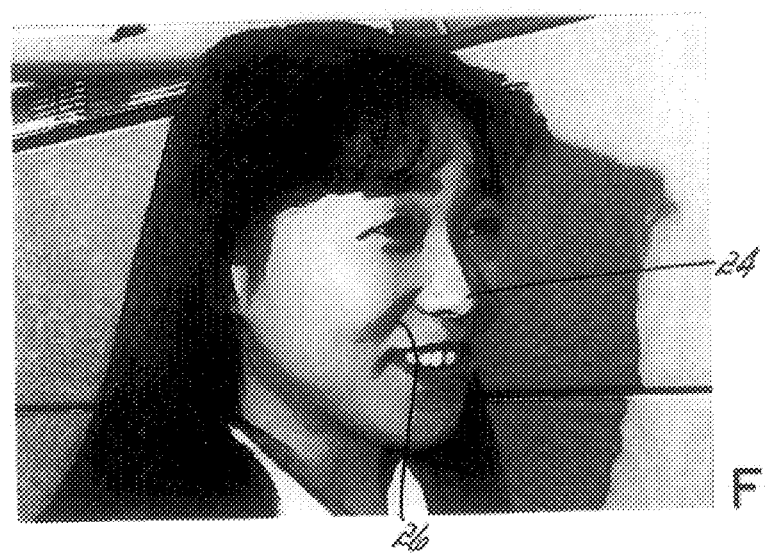
FIG. 2C is an image produced by detecting and enhancing edges in the image of FIG. 2A in accordance with principles of the invention.

Referring to FIG. 2C, in accordance with another aspect of the present invention, the initial image shown in FIG. 2A may be modified by locating contrast edges in the image, such as edges 24 and 26, and modifying the luminance of the image along those edges, producing a resulting image in which contrast lines such as lines 24 and 26 are significantly more pronounced, simulating the appearance of watercolor original artwork.

The following figures describe procedures for producing the effects described above. The microfiche appendix being deposited in the Patent Office herewith details a computer program written for a general purpose microprocessor in standard C language which carries out the procedures described in the following figures, and was used to generate, on a computer display, the images illustrated in FIGS. 2B and 2C.

Although the attached appendix details a program for a general purpose computer, the image processing procedures described below can be carried out in various other ways, e.g. by software running on a microprocessor embedded in a special purpose device, such as video printer 10, monitor 23, camera 12, or a stand-alone image processing unit. Alternatively, these procedures can be performed by special purpose computing circuitry in an expansion slot of a general purpose computer or embedded in a special purpose device. For clarity, in the following description, the general term "computing circuitry" will be used to collectively refer to any electronic configuration which can perform a computation, including by one or more microprocessors running software, by special purpose computing circuitry, or by a combination of both.

Figure 3:
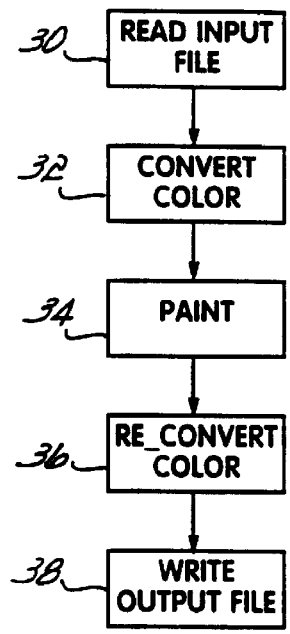
FIG. 3 is an overall flow chart of a computer program for adding simulated brush strokes to an image.

Referring to FIG. 3, to produce simulated brush strokes on an initial image, the computing circuitry first reads 30 a stored input file containing a pixellated representation of the image to be processed. Next, the image is converted 32 into a representation in which it may be more easily processed (as discussed with reference to FIG. 5 below). Then, the computing circuitry steps through the pixels of the image, producing or "painting" 34 simulated brush strokes onto the image. Once the image has been fully painted, the computing circuitry converts 36 the color representation back to its initial format, and writes 38 an output file containing the processed image.

Figure 4:
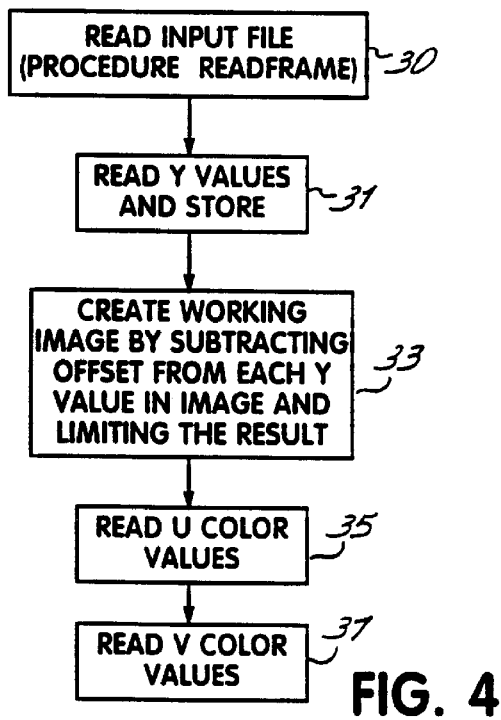
FIG. 4 is a flow chart of a procedure for reading a stored file for an image.

Referring to FIG. 4, to read an input file 30, the computing circuitry first reads 31 luminance (Y) values from input file and stores these values in a working buffer. Then the computing circuitry creates 33 a working copy of the image by subtracting a predetermined offset from each Y value and limiting the result to an allowable range. Thereafter, the computing circuitry reads 35 U color values, and reads 37 V color values from the input file and stores these values in working buffers.

Figure 5:
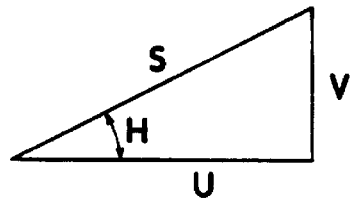
FIG. 5 is an illustration of the relationships of Saturation (S) and Hue (H) color values to U and V color values.

Referring to FIG. 5, the relationship between U and V color values and saturation (S) and hue (H) color values are based on trigonometry. If the U and V values represent the length of the two legs of a right triangle, the length of the hypotenuse of this triangle represents the color saturation value S, and the angle adjacent to the U leg represents the color hue value H.

Figure 6:
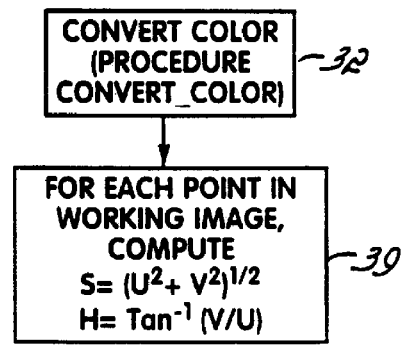
FIG. 6 is a flow chart of a procedure for converting U and V color values to S and H values.

Thus, referring to FIG. 6, to convert 32 color values to a usable representation at each pixel in the working image, the computing circuitry computes 39 the saturation value using the Pythagorean theorem, and computes the hue value from the inverse tangent of the ratio of the V value and the U value.

Figure 7:
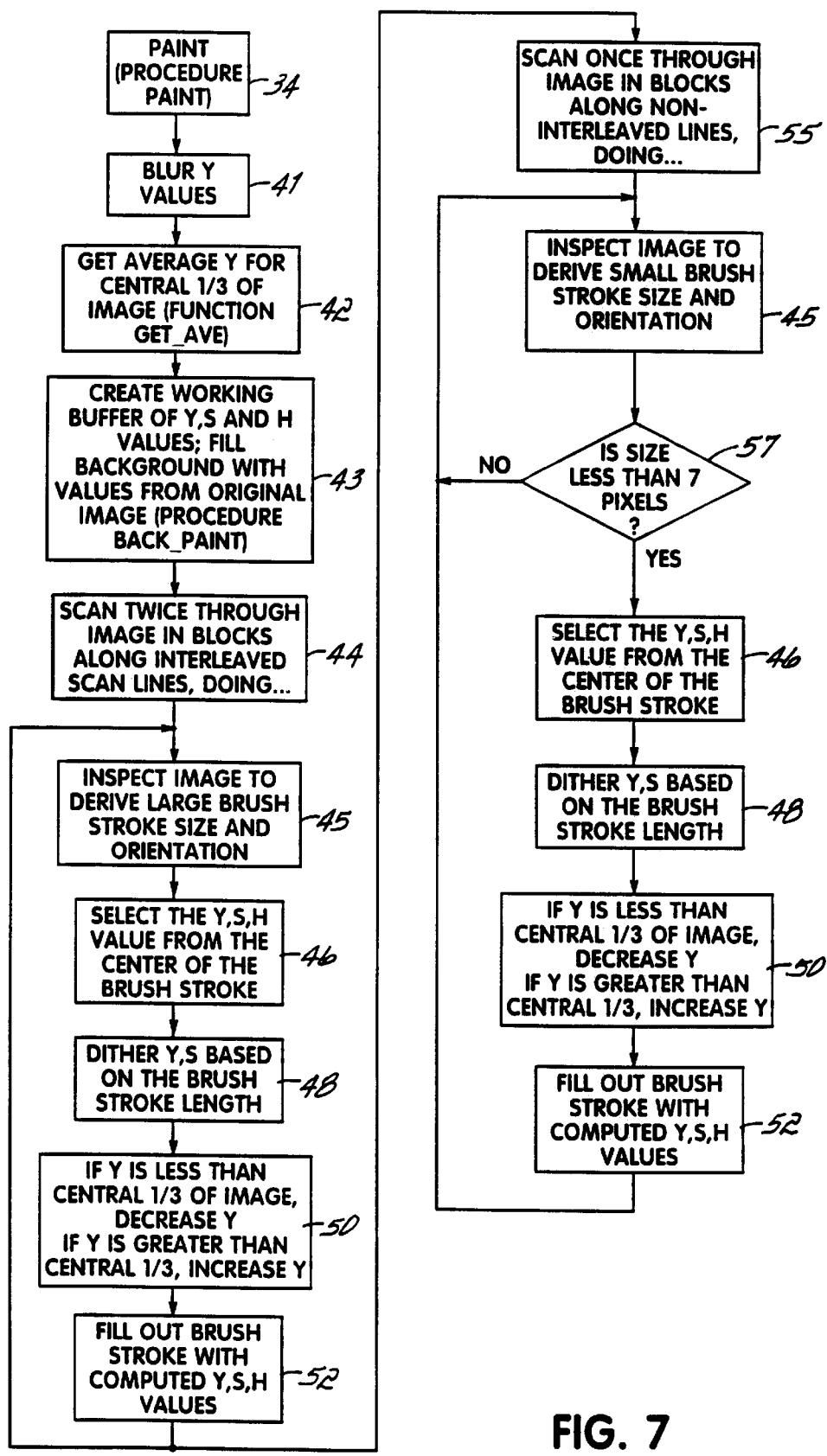
FIG. 7 is a flow chart of a procedure for painting brush strokes onto an image.

Referring to FIG. 7, to paint 34 brush strokes onto the image in the working buffer, the computing circuitry first blurs 41 the initial image by replacing each pixel's luminance value with the average of the luminance values of, e.g., 100 pixels in a square 10 by 10 pixel surrounding the pixel. This blurring process fills in gaps between brush strokes to be added by the procedures described below, to produce a more realistic result.

After the image in the working buffer has been blurred, the computing circuitry computes 42 the average luminance of the central one-third of the image. This value is used in the subsequent processing to enhance the contrast of the image, resulting in a more realistic result.

After the proceeding preliminary processing, the computing circuitry begins to generate simulated brush strokes. To do so, the computing circuitry first creates a working buffer to containing luminance, saturation and hue values for each pixel of the resulting image. The computing circuitry then fills this buffer with the blurred luminance, saturation and hue values from the initial image produced in step 41 described above. Because the buffer is initialized with a blurred, background version of the initial image, any gaps between simulated brush strokes are not noticeable in the resulting image.

To produce brush strokes, the computing circuitry scans three times through the image in blocks of, e.g., 7 pixels on a side. During the scans, the computing circuitry produces simulated brush strokes in visited blocks. During the first two scans 44, the computing circuitry produces large brush strokes in every visited block; during a third scan 55, the computing circuitry produces small brush strokes in visited blocks which meet certain criteria, as elaborated below.

The large brush strokes may be larger than the size of the block, and thus may overlap with brush strokes of neighboring blocks; when large brush strokes overlap, the more recent brush stroke erases the overlapping portions of the less recent brush stroke. To enhance the realism of the result, large brush stroke scanning 44 is interleaved; the first scan is performed along regularly-spaced rows of blocks crossing the image, and the second scan is performed along regularly-spaced rows which are interleaved with the rows of the first scan. By performing two interleaved scans, the resulting image includes a realistic mix of complete brush strokes (from the second scan) and partially erased brush strokes (from the first scan).

At each block during the three scans, the computing circuitry first inspects 45 the image in the working buffer and derives a brush stroke size and a brush stroke orientation. Brush stroke sizes and orientations are generated from the blurred image rather than the original image. This is done because the blurred image is relatively uncontaminated by noise and therefore will produce a smoother and more regular pattern of brush stroke sizes and orientations, which results in a more realistic effect.

To create a brush stroke, the computing circuitry selects 46 the luminance, saturation and hue values for the pixel at the center of the new brush stroke, and computes a new luminance and saturation value by dithering 48 (i.e., adding a randomly generated positive or negative increment to) the luminance and saturation values from the pixel at the center of the brush stroke.

Next, to increase the overall contrast of the image, the computing circuitry compares 50 the computed luminance value to that from the central one-third of the image computed in step 42. If the computed luminance is less than that of the central one-third of the image, the computed luminance is decreased; however, if the computed luminance is greater than that of the central one-third of the image, the computed luminance is increased.

Finally, the brush stroke is filled out 52 with the computed luminance, saturation and hue values and the computing circuitry proceeds to the next step across the image and repeats at step 45.

As noted above, during the first two scans, large brush strokes are generated in every visited block; thus the four steps 46, 48, 50 and 52 and performed in every visited block. However, during the third scan, small brush strokes are created in only a few of the visited blocks.

In an original oil painting, object edges are typically defined by a relatively large number of small brush strokes, a natural result of the need for precision when painting such edges. However, the body of an object is typically defined by a smaller number of large brush strokes, because less precision is needed in these areas. This methodology is simulated in accordance with the invention by producing small brush strokes only along contrast lines in the image.

Figure 8:
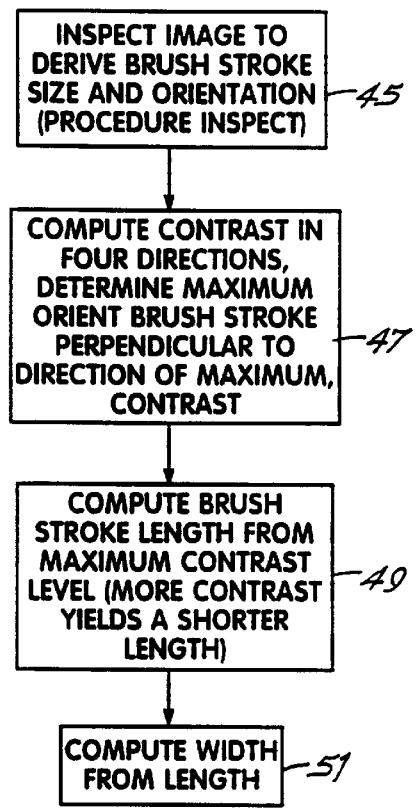
FIG. 8 is a flow chart of a subprocedure for deriving brush stroke sizes and orientations.

Specifically, during the scanning 55 which generates small brush strokes, the computing circuitry determines 57 at each block whether the image has high contrast at the location of the block, and only generates a small stroke if the image has high contrast. As elaborated below with reference to FIG. 8, inspection step 45 measures the contrast of the image at the current block and produces a small brush stroke size if the image has high contrast. Therefore, at step 57 the computing circuitry determines whether the brush stroke is small, e.g. less than seven pixels long, and if so generates the brush stroke through steps 46, 48, 50 and 52. If the brush stroke is larger than seven pixels, there are no significant lines of contrast in the current block, and the computing circuitry proceeds to the next block without generating a small brush stroke Referring to FIG. 8, at step 45, the computing circuitry inspects the image to derive brush stroke sizes and orientations. This is done by computing 47 the contrast of the initial image along four directions. These four directions can be, for example, vertical, horizontal and diagonal from lower left to upper right and diagonal from upper left to lower right. To compute the contrast in each of these directions, the computing circuitry computes the difference in luminance values of appropriate groups of pixels neighboring the pixel at the center of the brush stroke. For example, to compute the contrast in a horizontal direction, the computing circuitry computes the difference between luminance values at one or more pixels directly to the right of the central pixel and luminance values at one or more pixels directly to the left of the central pixel. The absolute value of the difference represents the contrast of the image at the brush stroke in the horizontal direction. Similar computations are performed along vertical and diagonal directions to generate four contrast values. The computing circuitry then determines which of these four values is the maximum value. The brush stroke is then oriented in a direction perpendicular to the direction of the maximum contrast value. By orienting brush strokes perpendicular to the direction of the maximum contrast, brush strokes in the processed image will be generally aligned along rather than across contrast lines in the image. This enhances the simulation of oil painting techniques, because oil paintings typically include brush strokes aligned along the direction of object outlines.

After computing the brush stroke direction, the brush stroke length is computed 49 with reference to the maximum contrast level determined in the proceeding step. Where the maximum contrast level is large, the length of the brush stroke is shortened. This also simulates oil painting techniques in that oil paintings typically include short brush strokes at detailed edges surrounding objects. The width of the brush stroke is computed 51 with reference to the length, so that the brush stroke is slightly longer than it is wide. Exemplary brush strokes are illustrated in FIGS. 10A, 10B, 10C and 10D, and are discussed in further detail below.

Figure 9:
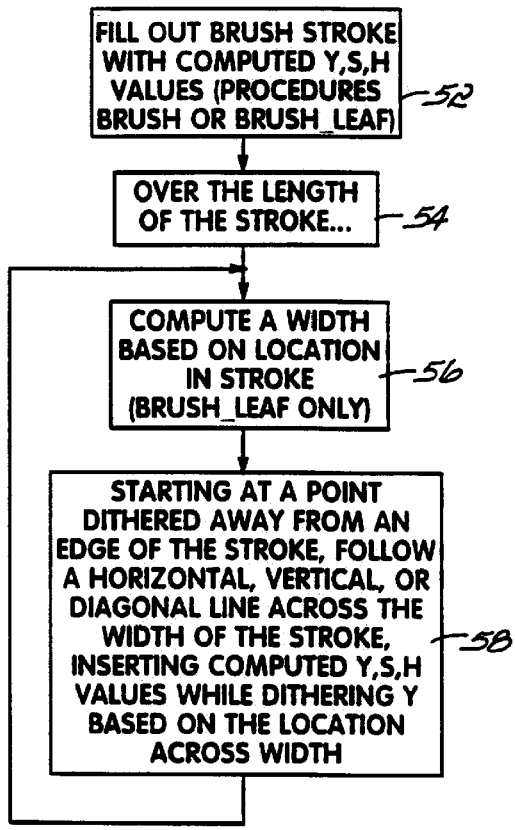
FIG. 9 is a flow chart of a subprocedure for filling out a brush stroke on the image.

Referring to FIG. 9, to fill out a brush stroke with computed luminance saturation and hue values 52 the computing circuitry repeatedly performs 54 a series of steps along the length of the brush stroke. The brush strokes produced may be rectangular or leaf-shaped.

Figure 10A:
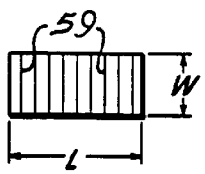
FIGS. 10A, 10B, 10C and 10D are illustrations of brush strokes formed by the subprocedures of FIGS. 8 and 9.
Figure 10B:
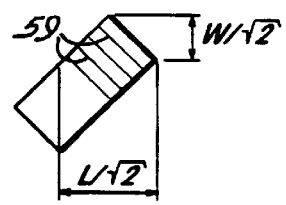

Exemplary rectangular brush strokes are shown in FIGS. 10A and 10B. FIG. 10A shows a horizontally oriented brush stroke having a horizontal length L and a vertical width W. FIG. 10B shows a diagonally oriented brush stroke of the same dimensions. (The horizontal and vertical dimensions in FIG. 10B are reduced by a factor of the square root of two because the stroke is at a 45 degree angle.)

Figure 10C:
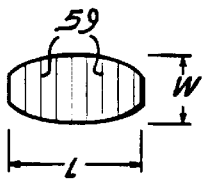
Figure 10D:
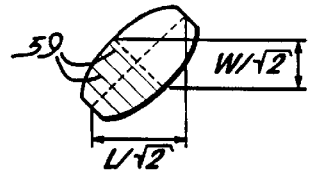

FIG. 10C shows a leaf-shaped brush stroke in a horizontal orientation and FIG. 10D shows a leaf-shaped brush stroke in a diagonal orientation. The leaf-shaped brush strokes are characterized by curved sides along their long dimensions. The curves are generated by a quadratic equation, and thus the curves are parabolic curves. The leaf-shaped brush stroke shown in FIG. 10C has a horizontal length L equal to the length L of the brush stroke shown in FIG. 10A. The maximum width W of the leaf-shaped brush stroke shown in FIG. 10C is equal to the width of the brush stroke shown in FIG. 10A. Similar relationships can be found between the diagonally oriented leaf-shaped brush stroke shown in FIG. 10D and the diagonally oriented rectangular brush stroke shown in FIG. 10B. (Again, the horizontal and vertical dimensions in FIG. 10D are reduced by a factor of the square root of two because the brush stroke in FIG. 10D is at a 45 degree angle.)

As noted above with reference to FIG. 9, brush strokes are produced by a series of steps executed along the length of the brush stroke. During each step, the computing circuitry follows 58 a vertical, horizontal, or diagonal line of pixels, such as lines 59 illustrated in FIGS. 10A–10D, across the width of the brush stroke, replacing each pixel along the line with the computed luminance, saturation and hue values. The computing circuitry starts at a pixel at a randomly selected position near to the edge of the brush stroke. For increased realism, the computing circuitry adds slight randomness to the appearance of the image, by randomly varying the luminance value Y as a line 59 is followed across the stroke. To do this, the luminance value is varied based upon the current location across the width of the brush stroke.

After filling out a line 59 across the width of the brush stroke, the procedure of FIG. 9 proceeds to the subsequent line across the width of the brush stroke, and so on until the brush stroke has been filled out completely.

Leaf-shaped brush strokes are created by an additional step 56 performed during the above-described procedure. In this step the computing circuitry computes 56 a brush stroke width based upon the current location along the length of the brush stroke. The equation used to compute the width value is, as noted above, a quadratic equation, and generates a maximum width value at the center of the brush stroke. After the brush stroke width has been computed, the computing circuitry fills out a line 59 across the brush stroke having the computed width, in the manner described above.

Figure 11:
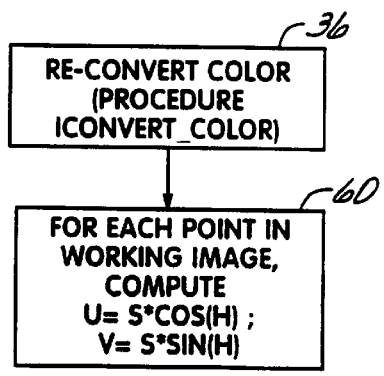
FIG. 11 is a flow chart of a procedure for converting S and H color values to U and V values.

Referring to FIG. 11, after the image has been processed to include brush strokes, the color representation is converted 36 back to U and V color values. To do this, for each pixel in the working buffer, the computing circuitry computes 60 the saturation S multiplied by the cosine of the hue H to generate the U value, and computes the saturation S multiplied by the sine of the hue H to produce the V value.

Figure 12:
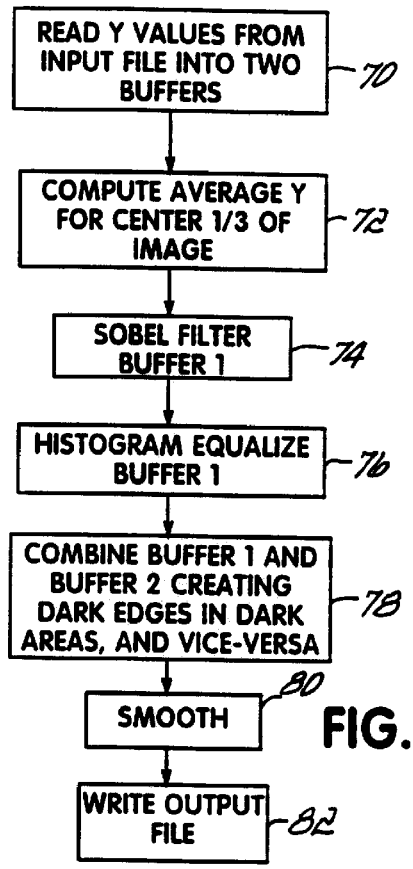
FIG. 12 is a flow chart of a computer program for enhancing edges of an image.

Referring to FIG. 12, in another aspect the invention features procedures for converting an image to have the appearance of watercolor painting. This procedure is shown generally in FIG. 12 and more specifically in the subsequent figures.

Referring to FIG. 12, to perform an edge detection conversion to generate the appearance of watercolor painting, the computing circuitry first reads 70 the luminance values from an input file into two buffers. (Color values are not processed in this procedure, although color processing, e.g., reducing or increasing color saturation, could be added to the procedure described herein to produce more realistic watercolor images.) The computing circuitry then computes 72 the average luminance value of the central one-third of the image. This value is used in subsequent processing described below. Next, the computing circuitry performs 74 a filtering operation on the first of the two buffers to locate contrast regions in the image. Various edge detecting filtering operations can be used at step 74, such as Laplacian filtering, Forsen filtering, and/or Sobel filtering. Sobel filtering has been found to create the strongest edges, and is used in the software in the attached appendix, and described below. After filtering, the computing circuitry processes 76 the luminance values in the first buffer by performing a logarithmic function on the values in the first buffer. After the above processing, the computing circuitry combines 78 the first buffer with the second, unmodified buffer. During this operation, the computing circuitry uses the contents of the first buffer to create dark edges in dark areas of the original image in the second buffer, and vice-versa. The resulting image is smoothed 80 in a manner discussed below, producing a final image which is written 82 to an output file.

Figure 13:
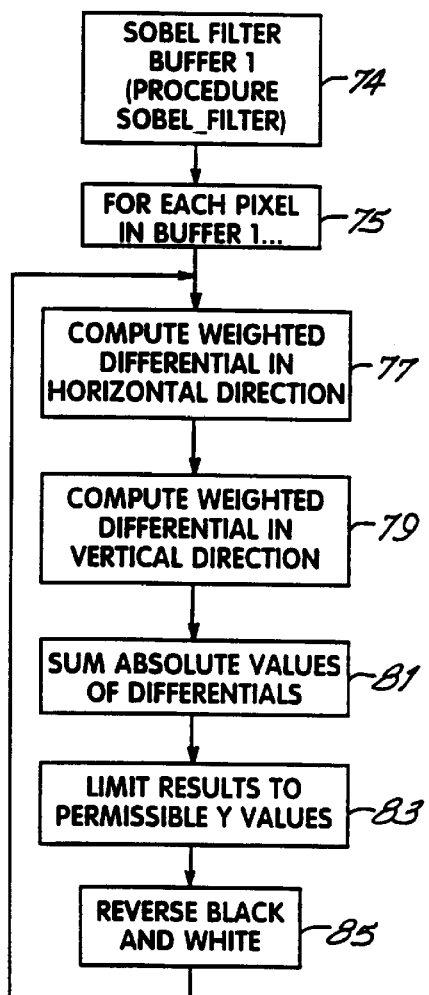
FIG. 13 is a flow chart of a procedure for finding edges in an image by computing differential luminance values.

To Sobel filter 74 an image in the first buffer, the computing circuitry performs 75 a sequence of steps shown in FIG. 13 for each pixel in the first buffer. First, the computing circuitry computes 77 a weighted differential in the horizontal direction. Then, the computing circuitry computes 79 a weighted differential in the vertical direction. The absolute values of these differentials are then summed 81 and the result is limited 83 to the range of permissible luminance values. Finally, the luminance values are reversed 85 from black to white and white to black, so that areas having high contrast are identified by relatively small luminance values in the first buffer, and vice-versa. To reverse white and black for the Sobel-filter result of a pixel, the minimum (black) and maximum (white) allowable luminance values are added together, and the result of the Sobel-filtering for the pixel is subtracted from the sum. If the Sobel-filter result for the pixel had a large (near-white) value, the result will be a proportionally small (near-black) value, and vice-versa.

To compute the weighted differentials steps 77 and 79 of FIG. 13, the computing circuitry multiplies neighboring pixels of the pixel being processed by weighted factors shown diagrammatically in FIG. 14A and FIG. 14B. To compute a weighted differential in the horizontal direction, and thereby locate vertically-oriented lines of contrast, the computing circuitry multiplies the three pixels to the left, upper left and to the lower left, respectively, by the values −2, −1 and −1; then, the computing circuitry multiplies the three pixels to the immediate right, upper right and lower right of the pixel being processed, respectively, by the values 2, 1 and 1. The results of these six multiplications are added together to produce a differential value.

Similarly, as shown in FIG. 14B, to compute a differential in the vertical direction, and thereby locate horizontally-oriented lines of contrast, the pixels immediately above, above and to the left, and above and to the right of the pixel being processed are respectively multiplied by −2, −1 and −1; and the pixels immediately below, below and to the left and below and to the right of the pixel being processed are multiplied respectively by 2, 1 and 1. The results of these multiplications are added together to generate a differential value in the vertical direction.

As can be seen from the proceeding discussion, the horizontal and vertical differential values represent the extent of horizontal and vertical contrast at the pixel for which the values are computed. Thus, the Sobel filtering procedure shown in FIG. 13 generates values representative of the contrast in the image at each respective pixel.

Figure 15:
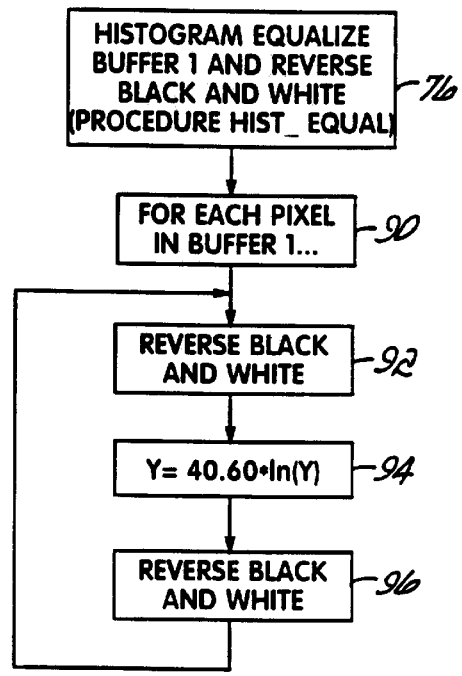
FIG. 15 is a flow chart of a procedure for modifying the output of the procedure of FIG. 13 to create a more realistic distribution of differential values.

Referring to FIG. 15, the procedure of FIG. 12 equalizes 76 the results of the Sobel filtering procedure discussed above. To accomplish this, for each pixel in the first buffer 90 the computing circuitry reverses 92 black and white values in the manner discussed above, replaces 94 each luminance value in the first buffer with the logarithm of the luminance value, and then reverses 96 black and white values.

The effect of the logarithmic computation described above is illustrated in FIGS. 16A and 16B. As shown in FIG. 16A, a histogram of all of the Sobel-filter results in the first buffer after step 74 includes a large number of pixels with near zero values and a large number of pixels with values at the maximum permissible value. However, in the mid-range of values, there is a relatively low number of pixels. However, as seen in FIG. 16B, by replacing each value with the logarithm of the value, the number of pixels in the mid-range of luminance values is substantially increased. Thus, the logarithmic histogram equalization increases, in a non-linear manner, small Sobel-filter result values to larger values. Therefore, effect of this operation on the image is to increase the emphasis on edges in images.

It should be noted that, for the logarithmic equalization to operate properly, areas of high contrast must be represented by large luminance values, and other areas represented by small luminance values. However, in step 85 (FIG. 13) black and white are reversed so that contrast edges are represented by small luminance values. Therefore, black and white must be re-reversed in step 92 before the logarithmic computation.

These two reversals of black and white in steps 85 and 92 happen in immediate succession in the software in the attached appendix, and may therefore initially appear to be unnecessary. However, the two reversals are included so that the histogram equalization procedure, i.e., all of the processing illustrated in FIG. 15, can be disabled at any given time without modifying any other procedures. This might be done to, for example, examine the difference in results with and without the logarithmic operation. In another application, steps 85 and 92 could be eliminated.

Referring to FIG. 17, to combine 78 the processed pixels from the first buffer and the unprocessed pixels from the second buffer, the circuitry or software performs 100 a number of steps for each pixel in the image. First, the computing circuitry determines 102 whether the unprocessed pixel in the second buffer has a luminance greater than the average luminance of the central one-third of the image (as previously computed) and whether the processed pixel in the first buffer is less than midscale of the possible luminance values. If both are the case, the computing circuitry reverses 104 black and white values in the first buffer in the manner discussed above. This causes edges in relatively light-colored areas to have bright outlines, while causing edges in relatively dark-colored areas to have dark outlines. Then, the computing circuitry produces a final luminance value for the pixel by multiplying 106 the corresponding pixels from the first and second buffer with each other and with a gain value. The resulting luminance value is limited 108 to the allowable range for luminance values and is stored as the final luminance value for the pixel.

Referring to FIG. 18, to smooth 80 the image produced by the proceeding steps, the circuitry or software performs 110 a loop processing each pixel by averaging 112 the pixel with a neighboring pixel, e.g., the pixel vertically neighboring the pixel. The result of this operation is to slightly blur the resulting image and produce a more realistic watercolor effect.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the procedures described above use the average luminance value from the central third of the image to approximate the average luminance value across the image. It has been found that this technique can result in erroneous results if the central third of the image is particularly bright or dark. Thus, in one alternative embodiment multiple different areas of the image may be used to compute the average luminance value. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for modifying an initial image to produce a resulting image having the appearance of custom art work, comprising storing a pixellated representation of said initial image in an electronic memory, inspecting pixels of said pixellated representation of said initial image to derive, without human input, modifications which reduce the precision of said initial image in a manner simulating techniques used by humans to produce custom art work, automatically applying said modifications to said pixels of said pixellated representation of said initial image to generate a pixellated representation of said resulting image, by blurring said initial image to form a background, and then selecting and modifying portions of said initial image over said blurred background, and producing a visual output of said resulting image.

2. The method of claim 1 wherein producing a visual output of said resulting image comprises one or more of printing a copy of said pixellated representation of said resulting image and generating a display of said pixellated representation of said resulting image on an electronic display device.

3. The method of claim 1 wherein modifying a selected portion comprises selecting a luminance and color value corresponding to one or more pixels within said selected portion of said initial image, comparing said selected luminance value to an average luminance value derived from a plurality of pixels of said initial image, reducing said selected luminance value if said selected luminance value is less than said average luminance value, otherwise increasing said selected luminance value, deriving pixel luminance and color values from said selected color value and said reduced or increased selected luminance value, and modifying pixels of said selected portion to approach said derived pixel luminance and color values.

4. The method of claim 3 wherein deriving pixel luminance and color values comprises augmenting said selected color value and said reduced or increased selected luminance value with pseudo-random noise to produce variation in luminance or color of pixels of said selected portion.

5. The method of claim 1 wherein selecting portions of said initial image comprises selecting elongated portions having substantially parabolic curved elongated edges.

6. The method of claim 1 wherein selecting portions of said initial image further comprises selecting elongated portions oriented in one of at least two possible directions.

7. The method of claim 1 wherein selecting portions of said initial image comprises selecting a first set of rows of blocks extending through said image, and then selecting a second set of rows of blocks interleaved with said first set of rows of blocks and extending through said image, and modifying said portions comprises modifying portions along said first set of rows prior to modifying portions along said second set of rows, whereby modifications of said portions are variably overlapped within said image.

8. The method of claim 1 wherein selecting portions of said initial image comprises selecting large portions and smaller portions of said image, and modifying said portions comprises modifying said large portions prior to modifying said smaller portions.

9. The method of claim 8 wherein selecting large portions of said image comprises selecting large portions along a first set of rows extending through said image, and selecting large portions along a second set of rows interleaved with said first set of rows and extending through said image, and modifying said portions comprises modifying portions along said first set of rows prior to modifying portions along said second set of rows, whereby modifications of said large portions are variably overlapped within said image.

10. The method of claim 8 wherein selecting smaller portions of said image comprises determining contrast of said image and selecting smaller portions in regions of said image having high contrast.

11. The method of claim 1 wherein selecting and modifying portions of said pixellated representation of said initial image to reduce the precision of said initial image comprises locating contrast edges in the initial image, and modifying luminance of said initial image along said edges, whereby objects in said resulting image have enhanced definition from background.

12. The method of claim 11 wherein modifying luminance of said initial image along said edges comprises increasing luminance of said image along edges in relatively high luminance areas of said image, and decreasing luminance of said image along edges in relatively low luminance areas of said image.

13. The method of claim 11 wherein modifying luminance of said initial image along said edges comprises generating at each pixel of said initial image a differential measure of luminance contrast in two directions, and modifying luminance of pixels of said initial image by combining each said differential measure with luminance of a corresponding pixel in said initial image, to generate luminance values for said resulting image.

14. The method of claim 13 wherein generating a differential measure of contrast at a pixel includes computing a luminance variation between pixels neighboring said pixel.

15. The method of claim 13 wherein combining each said differential measure with its corresponding pixel in said initial image comprises multiplying each said differential measure with luminance of a corresponding pixel in said initial image.

16. The method of claim 13 wherein combining each said differential measure with a corresponding pixel in said initial image comprises determining whether said differential measure is below a threshold value, and if so modifying said differential measure by subtracting it from a predetermined maximum value, and multiplying each thus modified differential measure with luminance of said corresponding pixel in said initial image.

17. The method of claim 13 wherein combining each said differential measure with a corresponding pixel in said initial image comprises deriving an average luminance value for said initial image from a plurality of pixels of said initial image, determining whether luminance of said corresponding pixel in said initial image is above said average luminance value, and if so modifying said differential measure by subtracting it from a predetermined maximum value, and multiplying each thus modified differential measure with luminance of said corresponding pixel in said initial image.

18. Apparatus for modifying an initial image to produce a resulting image having the appearance of custom art work, comprising an electronic memory storing a pixellated representation of said initial image, computing circuitry inspecting pixels of said pixellated representation of said initial image to derive, without human input, modifications which reduce the precision of said initial image in a manner simulating techniques used by humans to produce custom art work, and automatically applying said modifications to said pixels of said pixellated representation of said initial image to generate a pixellated representation of said resulting image, by blurring said initial image to form a background, and then selecting and modifying portions of said initial image over said blurred background, and an output port for connection to an output device capable of producing a visual output of said resulting image.

19. The apparatus of claim 18 wherein said output port is configured for connection to a printer.

20. The apparatus of claim 18 wherein said output port is configured for connection to an electronic display monitor.

21. The apparatus of claim 18 wherein said computing circuit selects portions of said initial image by selecting a first set of rows of blocks extending through said image, and then selecting a second set of rows of blocks interleaved with said first set of rows of blocks and extending through said image, and said computing circuit modifies portions along said first set of rows prior to modifying portions along said second set of rows, whereby modifications of said portions are variably overlapped within said image.

22. The apparatus of claim 18 wherein said computing circuit selects large portions and smaller portions of said image, and said computing circuit modifies said large portions prior to modifying said smaller portions.

23. The apparatus of claim 22 wherein said computing circuit selects smaller portions of said image by determining contrast of said image and selecting smaller portions in regions of said image having high contrast.

24. The apparatus of claim 18 wherein said computing circuitry modifies pixels of said pixellated representation of said initial image to reduce the precision of said initial image by locating contrast edges in the initial image, and modifying luminance of said initial image along said edges, whereby objects in said resulting image have enhanced definition from background.

25. The apparatus of claim 24 wherein said computing circuitry modifies luminance of said initial image along said edges by increasing luminance of said image along edges in relatively high luminance areas of said image, and decreasing luminance of said image along edges in relatively low luminance areas of said image.

26. The apparatus of claim 24 wherein said computing circuitry modifies luminance of said initial image along said edges by generating at each pixel of said initial image a differential measure of luminance contrast in two directions, and modifying luminance of pixels of said initial image by combining each said differential measure with luminance of a corresponding pixel in said initial image, to generate luminance values for said resulting image.

27. The apparatus of claim 26 wherein said computing circuitry generates a differential measure of contrast at a pixel by computing a luminance variation between pixels neighboring said pixel.

28. The apparatus of claim 26 wherein said computing circuitry combines each said differential measure with its corresponding pixel in said initial image by multiplying each said differential measure with luminance of a corresponding pixel in said initial image.

\* \* \* \* \*